United States Patent [19]

Parkes et al.

[11] 4,068,755
[45] Jan. 17, 1978

[54] WET BELT CONVEYOR

[75] Inventors: David M. Parkes, Calgary; John D. Shaw, Fernie, both of Canada

[73] Assignee: Kaiser Resources, Limited, Vancouver, Canada

[21] Appl. No.: 707,811

[22] Filed: July 22, 1976

[30] Foreign Application Priority Data

Apr. 6, 1976 Canada .................................. 249696

[51] Int. Cl.² ............................................ B65G 15/04
[52] U.S. Cl. .................... 198/557; 198/841; 198/861; 302/14
[58] Field of Search ............... 198/637, 716, 836, 841, 198/547, 557, 861; 61/14, 15; 209/173; 210/160, 526; 302/11, 12, 13, 14

[56] References Cited

U.S. PATENT DOCUMENTS

| 2,003,730 | 6/1935 | Baldwin | 61/14 |
| 2,444,688 | 7/1948 | Wilson | 61/14 |
| 2,603,352 | 7/1952 | Tromp | 209/173 |
| 2,710,683 | 6/1955 | McClenny, Jr. | 198/836 |
| 2,984,335 | 5/1961 | Rhodes | 198/637 |
| 3,265,192 | 8/1966 | Stadelman | 198/841 |
| 3,752,314 | 8/1973 | Brown et al. | 61/14 |
| 3,795,316 | 3/1974 | Wood | 210/526 |
| 3,924,895 | 12/1975 | Leasure | 302/14 |

Primary Examiner—John J. Love
Assistant Examiner—Richard K. Thomson

[57] ABSTRACT

A conveyor for use in hydraulic mining operations to convey a slurry of water and heavy mined aggregate under conditions where the grade is insufficient to effectively accommodate gravity flow. The conveyor comprises a flume trough having a generally flat lower surface and a continuous belt conveyor having a lower reach disposed within the trough in engagement with the lower surface thereof. In use, the slurry is introduced into the trough and the belt conveyor is driven to move the lower reach in the direction that it is desired to move the slurry. Heavy aggregate within the slurry settles out onto the lower reach of the belt conveyor and is conveyed thereby. Water and suspended aggregate is moved within the flume under the influence of gravity, if any, and the influence of the moving lower reach of the belt conveyor and the moving heavy aggregate carried thereby.

7 Claims, 3 Drawing Figures

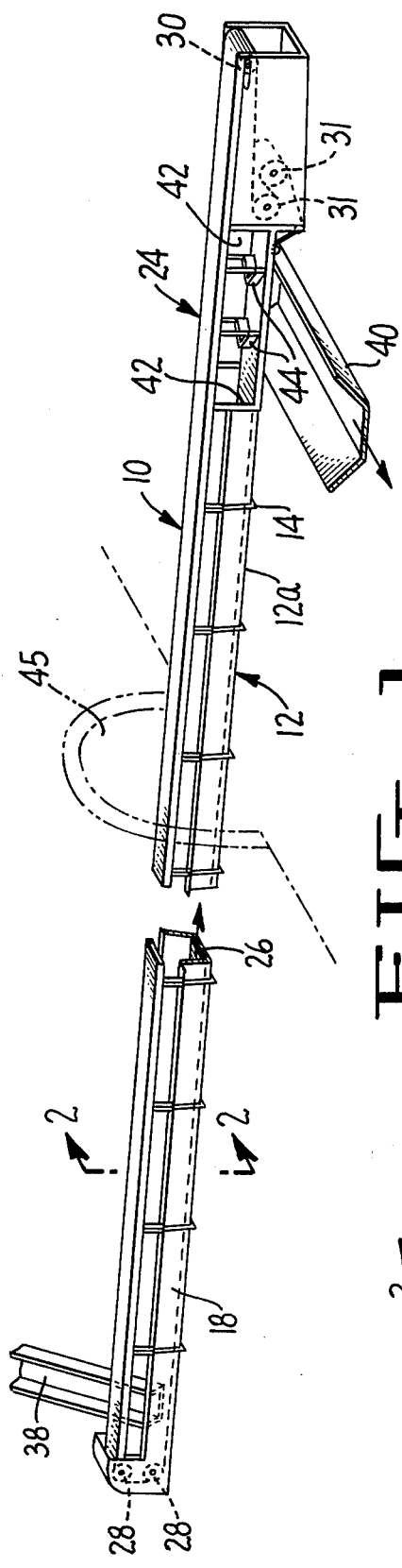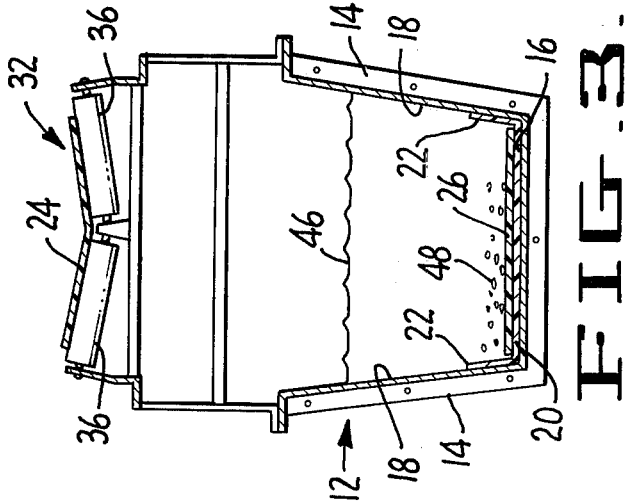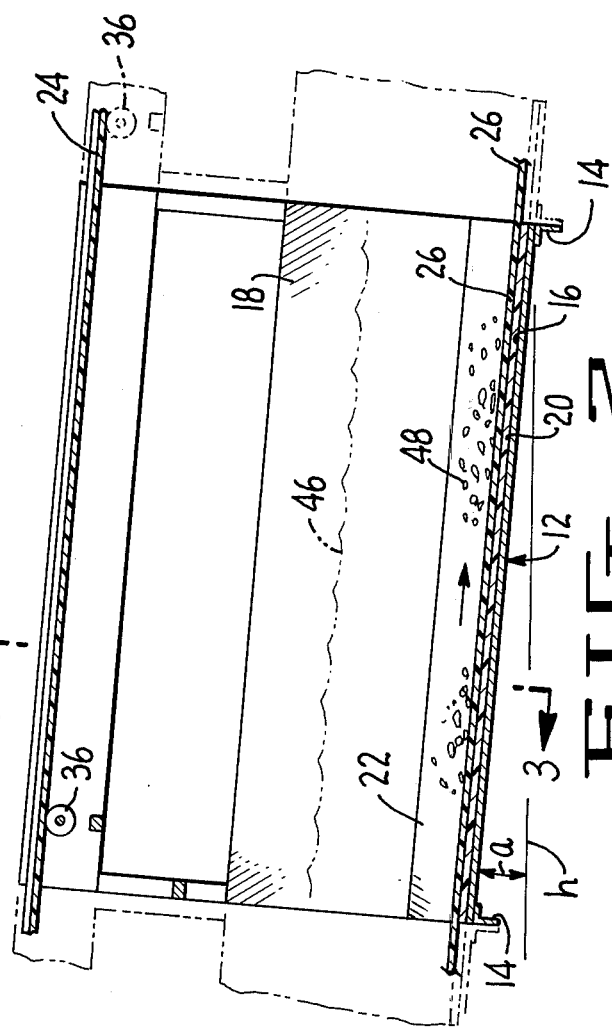

WET BELT CONVEYOR

BACKGROUND OF THE INVENTION

The present invention relates to a conveyor apparatus and method for use in conveying the slurry of mined aggregate and water which results from hydraulic mining operations. The invention is particularly concerned with such a method and apparatus which is designed for use over lengths of the mine where the grade is insufficient to accommodate gravity flow in a conventional flume.

Prior art of the type with which the present invention is concerned is typified by Canadian Patent No. 966,153, granted Apr. 15, 1975. That patent shows an hydraulic mining apparatus wherein the slurry of water and mined aggregate discharged from the apparatus is directed into a flume for gravity conveyance. This type of conveyance is very effective where the mine conditions are such that an adequate grade for gravity flow is provided. It is not, however, well suited for use over lengths within mines where the downgrade from horizontal is less than about 4°.

The present invention is ideally suited for conveyance of any of the products which result from hydraulic mining operations. For example, it is anticipated that the invention might be employed to convey coal, tar sands, uranium ore, phosphate, etc. The problem which the present invention is intended to solve (i.e., that of insufficient grade to promote gravity flow) is particularly acute with products where the mined aggregate is very dense and/or large. This results because such aggregate is more likely to settle out than lighter aggregate or aggregate which is in relatively small particles.

SUMMARY OF THE INVENTION

The conveyor apparatus of the present invention comprises a flume trough having upstream and downstream ends and a generally flat lower surface or bottom, a continuous belt conveyor having a lower reach extending lengthwise of the trough and over the bottom thereof, means at the upstream end of the trough to discharge a slurry thereinto and means at the downstream end of the trough to remove a slurry therefrom in response to movement of the slurry towards the downstream end. The apparatus also includes drive means to continuously move the lower reach of the belt and any aggregate supported thereon from the upstream end to the downstream end of the trough.

The method of the invention is concerned with the conveying of a hydraulically mined slurry over a length within a mine wherein the downgrade from the upstream to the downstream ends of the length is between 0° and 4° from horizontal. The method comprises the steps of extending a flat bottomed flume trough over the length, extending a closed loop belt conveyor over the length of the flume trough with the lower reach of the conveyor extending lengthwise of and covering the bottom of the trough, directing slurry to be conveyed into the flume trough at the upstream end thereof, driving the belt and conveyor to move the lower reach of the conveyor in the downgrade direction whereby aggregate which settles out of the slurry is moved toward the downstream end of the length by said reach and the settled out aggregate thus moved imparts downstream movement to the slurry. The final step of the method comprises removing the slurry and any settled out aggregate from the flume trough at the downstream end thereof.

OBJECTS OF THE INVENTION

A principal object of the invention is to provide an apparatus and method for conveying the slurry which results from hydraulic mining operations over lengths within the mine being worked which do not have sufficient grade to facilitate gravity flow of the slurry.

Another and more specific object of the invention is to provide such an apparatus and method wherein conveyance of the slurry is achieved within a flume, which flume incorporates a wet belt conveyor to convey heavy aggreage which settles out of the slurry.

Still another object of the invention is to provide such an apparatus and method wherein the settled out aggregate carried and supported by the wet belt conveyor functions to impart movement to the slurry within the flume.

Another and more specific object of the invention is to provide such an apparatus wherein the wet belt conveyor is a continuous, closed loop belt and the flume comprises a trough with support means for the belt.

The foregoing and other objects will become more apparent when viewed in light of the accompanying drawings and following detailed description.

BRIEF DESCRIPTION OF THE DRAWING

FIG. 1 is a perspective view of the conveyor of the present invention, with a phantom-line illustration showing a mine shaft within which the conveyor is disposed;

FIG. 2 is a cross-sectional view of the conveyor, with parts thereof broken away, taken on the plane designated by Line 2—2 of FIG. 1;

FIG. 3 is a cross-sectional view of the conveyor taken on the plane designated by Line 3—3 in FIG. 2.

DESCRIPTION OF THE ILLUSTRATED EMBODIMENT

The conveyor of FIG. 1 is designated in its entirety by the numeral 10 and comprises, as its principal element, a flume trough 12 made up of a plurality of sections 12a bolted together in sealed end-to-end relationship by flanges 14. As may best be seen from FIG. 3, the flume trough has a smooth interior surface defined by a bottom wall or surface 16 and side walls 18 extending upwardly from the bottom wall in diverging relation. In the preferred embodiment illustrated, the bottom portion of the flume trough is lined with a polymer plastic lining comprising a bottom liner element 20 and side liner elements 22. The side liner elements 22 extend only partially up the side walls 18. The purpose of the liner elements is to protect the inside surface of the trough from abrasion by aggregate conveyed therein and to minimize friction between the bottom wall of the trough and the wet belt conveyor (to be described subsequently) which runs therein.

The wet belt conveyor within the flume trough 12 comprises a closed loop belt conveyor 24 having the lower reach 26 thereof disposed over and in sliding engagement with the bottom of the trough. At one end of the flume trough, the conveyor 24 is directed over spaced idler rolls 28 and at the other end of the flume trough the conveyor is directed over a tensioning idler roll 30 and drive rolls 31. The details of the tensioning and drive roll arrangement may take any conventional form and are here shown schematically simply for exemplification.

The upper reach of the conveyor 24 is supported on a plurality of support roll assemblies 32, each of which assemblies is supported on a bracket structure 34 secured to and supported by the side walls of the flume trough. In the preferred embodiment illustrated, each support roll assembly 32 comprises a pair of canted idler rolls 36 which are disposed in engagement with the undersurface of the upper reach of the conveyor belt.

Although the material from which the belt of the conveyor 24 is fabricated may vary without departing from the spirit of the invention, a woven polyester belt impregnated with polyvinyl chloride has ideal properties. With such a belt, the woven outer surface of the belt may be left exposed so that the polyester fibers may engage the undersurface of the flume trough. This arrangement takes advantage of the very low coefficient of resistance provided by the woven polyester fibers.

The basic conveyor structure is completed by an inlet trough 38 provided at the upstream end of the conveyor (the lefthand end, as viewed in FIG. 1) and an outlet trough 40 provided at the downstream end of the conveyor (the righthand end as viewed in FIG. 1). The trough 38 discharges directly onto the upper surface of the lower reach 26. The trough 40 is disposed beneath the conveyor and the sides of the flume trough are excised at 42 to permit the slurry within the flume trough to discharge therefrom into the trough 40. The flume trough 12 carries a pair of ploughs 44 disposed above the outlet trough 40 to plough aggregate which collects on the reach 26 off of either side thereof and through the excised openings 42.

The illustrated embodiment is intended to show the flume trough 12 in a nearly horizontal position. Actually, it is anticipated that the invention might be employed whereever the conditions within the mine are such that the downstream slope of the length over which it is intended to convey material is between 0° and 4° from horizontal. For the sake of illustration, this angle is depicted by the letter "a" in FIG. 2. The horizontal is graphically illustrated in FIG. 2 by the line "h".

The phantom line showing in FIG. 1, designated 45, is intended to show a mine shaft within which the conveyor of the present invention is confined. This tunnel-enclosed environment is exemplary of the type of situation where the grade might be limited. As shown in FIG. 1, the inlet trough 38 and outlet trough 40 are in relatively unrestricted confines and have a downgrade considerably in excess of 4° from horizontal.

It should be appreciated that the conveyor of the present invention facilitates conveyance of the slurry being handled both by gravity and by operation of the wet belt (i.e., reach 26) provided within the flume trough. The degree of gravity flow depends upon the slope of the flume trough. The degree to which the wet belt assists in conveyance depends upon both the slope and the size and density of the aggregate being transported. Where a substantial amount of aggregate collects on the wet belt, the wet belt functions not only to move the aggregate collected therein, but also, through action of that aggregate on the slurry within the trough, functions to impart movement to the slurry. For the sake of illustration, FIGS. 2 and 3 show a slurry within the flume trough, with the upper surface of the slurry designated by the numeral 46. These figures also illustrate aggregate 48 which has settled out on the lower reach 26 and is being transported thereby. The arrow line in FIG. 2 indicates the direction of transport.

CONCLUSION

From the foregoing description and the accompanying drawings, it is believed apparent that the present invention enables the attainment of the objects initially set forth herein. It should be understood, however, that the invention is not intended to be limited to the specifics of this embodiment, but rather is defined by the accompanying claims.

What is claimed is:

1. A conveyor for use in a mine to convey a slurry of water and heavy aggregate over runs of long distance within the mine and of insufficient grade to enable effective gravity flow within a fixed flume, said conveyor comprising a flume trough having upstream and downstream ends and a generally flat lower surface, said trough extending over the length of said run at substantially the same downward slope as said run; a continuous belt conveyor having a lower reach supported on the lower surface of the trough and extending over the length of the trough, end portions extending upwardly from the lower surface of the trough, and an upper reach supported on said trough in spaced relationship to the lower surface thereof; means at the upstream end of the flume trough to load a slurry into the trough and onto the lower reach of the belt within the trough; means at the downstream end of the trough to remove slurry from the trough in response to movement of the slurry toward the downstream end; and means to drive the belt conveyor to continuously move the lower reach and any aggregate supported thereon from the upstream end to the downstream end of the trough whereby heavy aggregate which settles out of the slurry is carried by the lower reach of the belt conveyor, while water and suspended aggregate is conveyed in the trough through the influence of gravity and the movement of the lower reach conveyor belt and aggregate supported thereon.

2. A conveyor, according to claim 1, further including a plough extending across the lower reach of the conveyor at the downstream end of the trough to remove aggregate collected on the conveyor in response to conveyor movement.

3. A conveyor, according to claim 1, further comprising a plastic polymer liner covering the lower surface of the flume trough in interposed relationship between said surface and the lower reach of the belt.

4. A conveyor, according to claim 3, wherein said liner extends at least partially up the sides of the flume trough.

5. A conveyor, according to claim 1, wherein the flume trough extends at a downward slope of between zero and four degrees from horizontal from the upstream end to the downstream end thereof.

6. In a mine being worked by a hydraulic mining operation wherein the resulting product comprises a slurry of mined aggregate and water, a method of conveying the slurry over a long distance within the mine where the down grade from the upstream to downstream ends of said distance is between zero and four degrees from horizontal, said method comprising: extending a flat bottomed flume trough over said distance; extending a closed loop belt conveyor over the length of the flume trough with the lower reach of the conveyor supported on and covering the bottom of the trough, end portions of the conveyor extending upwardly from the bottom of the trough, and the upper reach of the conveyor supported on the trough in spaced relationship to the bottom thereof; directing slurry to be conveyed into the flume trough at the upstream end thereof; driving the belt conveyor to move the lower reach of the conveyor in the downgrade direction whereby aggregate which settles out of the slurry is moved toward the downstream end of the trough by said reach and the settled out aggregate thus moved imparts downstream movement to the slurry; and, removing the slurry and any settled out aggregate from the flume trough at the downstream end thereof.

7. A method, according to claim 6, wherein the settled out aggregate is removed from the flume trough by extending a plough across the lower reach of the conveyor at the downstream end of the trough.

* * * * *